(12) United States Patent
Yamada et al.

(10) Patent No.: US 11,072,152 B2
(45) Date of Patent: Jul. 27, 2021

(54) MULTILAYER FILM, LAMINATE, AIRBAG, AND METHOD OF MANUFACTURING LAMINATE

(71) Applicants: Nitto Denko Corporation, Osaka (JP);
Nitto Switzerland AG, Schmitten (CH)

(72) Inventors: Yosuke Yamada, Osaka (JP); Toru Tagami, Osaka (JP); Michael Ludwig, Raubling (DE)

(73) Assignees: Nitto Denko Corporation, Osaka (JP);
Nitto Switzerland AG, Schmitten (CH)

( * ) Notice: Subject to any disclaimer, the term of this patent is extended or adjusted under 35 U.S.C. 154(b) by 0 days.

(21) Appl. No.: 16/710,458

(22) Filed: Dec. 11, 2019

(65) Prior Publication Data
US 2020/0114631 A1    Apr. 16, 2020

Related U.S. Application Data

(63) Continuation of application No. PCT/JP2018/022994, filed on Jun. 15, 2018.

(30) Foreign Application Priority Data

Jun. 16, 2017   (JP) .............................. JP2017-119100

(51) Int. Cl.
*B32B 27/12* (2006.01)
*B32B 27/36* (2006.01)
(Continued)

(52) U.S. Cl.
CPC ................ *B32B 27/12* (2013.01); *B32B 5/02* (2013.01); *B32B 7/027* (2019.01); *B32B 7/12* (2013.01);
(Continued)

(58) Field of Classification Search
CPC ...... B32B 2274/00; B60R 2021/23514; B60R 21/235; B60R 21/23504; B60R 21/23509;
(Continued)

(56) References Cited

U.S. PATENT DOCUMENTS 3,932,326 A    1/1976   Hoh et al.
4,130,603 A   12/1978   Tanaka et al.
(Continued)

FOREIGN PATENT DOCUMENTS

CN    106604817    4/2017
EP    1466724      10/2004
(Continued)

OTHER PUBLICATIONS

The Arnitel(R); copolyester elastomers website published online by PlasticsNet at https://www.plasticsnet.com/doc/arnitelr-copolyester-elastomers-0001, p. 1 (Year: 2020).*
(Continued)

*Primary Examiner* — Lee E Sanderson
(74) *Attorney, Agent, or Firm* — IPUSA, PLLC

(57) ABSTRACT

A multilayer film, which is used upon being adhered to a fabric, includes an adhesive layer to be a side of the multilayer film to be adhered to the fabric, the adhesive layer including a thermoplastic polyester elastomer and a polymer having a Shore D hardness of less than 80; and a barrier layer bonded to the adhesive layer, the barrier layer including a thermoplastic elastomer.

16 Claims, 2 Drawing Sheets

(51) Int. Cl.
  *B32B 7/12* (2006.01)
  *B32B 7/027* (2019.01)
  *B32B 5/02* (2006.01)
  *B32B 37/06* (2006.01)
  *B60R 21/235* (2006.01)

(52) U.S. Cl.
  CPC .............. *B32B 27/36* (2013.01); *B32B 37/06* (2013.01); *B60R 21/235* (2013.01); *B32B 2262/0276* (2013.01); *B32B 2605/00* (2013.01); *B60R 2021/2358* (2013.01); *B60R 2021/23509* (2013.01)

(58) Field of Classification Search
  CPC ...... B60R 21/53514; B60R 21/235519; B60R 21/23523; B60R 21/23595; B60R 21/16; B60R 21/161; B60R 21/162; B60R 21/164; B60R 21/165; B60R 21/167; B60R 21/168; B60R 21/18; B60R 21/20; B60R 21/201; B60R 21/203; B60R 21/2032; B60R 21/2035; B60R 21/2037; B29L 2022/27; B29L 2022/02; B29L 2022/022; B29L 2022/025; B29L 2022/07; B29L 2022/027; C09J 167/02; C09J 167/025; C09J 167/03; C09J 167/04; C09J 167/05; C09J 167/06; C09J 167/07; C09J 167/08; C08L 67/025; Y10T 428/1362; Y10T 428/1366; Y10T 428/1334; Y10T 428/1341; Y10T 428/31786
  USPC ................ 442/287, 293, 395; 428/36.1, 36.2
  See application file for complete search history.

(56) References Cited

U.S. PATENT DOCUMENTS

| | | | |
|---|---|---|---|
| 5,277,230 A | | 1/1994 | Sollars, Jr. |
| 5,403,123 A | | 4/1995 | Walters |
| 5,534,575 A | | 7/1996 | Foster et al. |
| 5,614,302 A | * | 3/1997 | Nance, Jr. ............... A41D 31/02 442/286 |
| 6,015,524 A | * | 1/2000 | Kuder ........................ B32B 7/12 264/173.12 |
| 6,416,613 B1 | | 7/2002 | Patrick et al. |
| 2002/0033589 A1 | * | 3/2002 | Barnes ................... B32B 27/12 280/728.1 |
| 2004/0006182 A1 | * | 1/2004 | Omori .................... B29C 48/00 525/193 |
| 2004/0071927 A1 | * | 4/2004 | Murphy ............... D06N 7/0089 428/95 |
| 2006/0035549 A1 | | 2/2006 | Honna |
| 2006/0160453 A1 | | 7/2006 | Suh |
| 2006/0252322 A1 | | 11/2006 | DeBenedictis et al. |
| 2007/0065614 A1 | | 3/2007 | Schulthess |
| 2008/0169631 A1 | * | 7/2008 | Hill ....................... B60R 21/235 280/743.1 |
| 2008/0306216 A1 | * | 12/2008 | Sommerfeld ........... B32B 27/00 525/190 |
| 2009/0023005 A1 | | 1/2009 | Snuverink Ook Lansink et al. |
| 2009/0023841 A1 | | 1/2009 | Yamauchi |
| 2009/0208720 A1 | | 8/2009 | Miyamoto et al. |
| 2009/0224515 A1 | | 9/2009 | Breed et al. |
| 2010/0255270 A1 | | 10/2010 | Stuebiger |
| 2013/0328293 A1 | | 12/2013 | Kuramoto |
| 2014/0220369 A1 | * | 8/2014 | Ishikawa ................... G09F 3/04 428/483 |
| 2017/0072668 A1 | | 3/2017 | Ishikawa et al. |
| 2017/0190158 A1 | | 7/2017 | Ishikawa et al. |
| 2018/0086300 A1 | | 3/2018 | Yamada et al. |

FOREIGN PATENT DOCUMENTS

| | | | |
|---|---|---|---|
| JP | S51-115541 | | 10/1976 |
| JP | S54-052143 | | 4/1979 |
| JP | S58-222847 | | 12/1983 |
| JP | 02114035 A | * | 4/1990 |
| JP | H02-114035 | | 4/1990 |
| JP | H03-007337 | | 1/1991 |
| JP | H03-294542 | | 12/1991 |
| JP | H04-201649 | | 7/1992 |
| JP | H05-338092 | | 12/1993 |
| JP | H10-273002 | | 10/1998 |
| JP | 2002-265891 | | 9/2002 |
| JP | 2003-526552 | | 9/2003 |
| JP | 2005-111926 | | 4/2005 |
| JP | 2007-296798 | | 11/2007 |
| JP | 2011-102365 | | 5/2011 |
| KR | 20140087848 A | * | 7/2014 |
| WO | 2010/134494 | | 11/2010 |
| WO | 2015/133314 | | 9/2015 |
| WO | 2016/158287 | | 10/2016 |

OTHER PUBLICATIONS

Wypych, George, Handbook of Polymers 2nd ed., 2016, ChemTec Publishing (Year: 2016).*
International Search Report dated Aug. 14, 2018 with respect to PCT/JP2018/022994.
Office Action dated Jun. 3, 2020 issued with respect to the corresponding Indian Patent Application No. 201917051393.
Extended European Search Report dated Jun. 5, 2020 issued with respect to the corresponding European Patent Application No. 18816593.0.
International Search Report dated Aug. 14, 2018 with respect to PCT/JP2018/022992.
Extended European Search Report dated Jun. 5, 2020 issued with respect to the related European Patent Application No. 18818240.6.
"Base for air bag for motor car—comprises fabric, primer layer and polyester elastomer layer, to give improved bonding, flexibility and strength", DERWENT, Jan. 14, 1991 (Jan. 14, 1991), XP002178603.
Extended European Search Report dated Jul. 3, 2020 issued with respect to the related European Patent Application No. 20157485.2.
Office Action dated Jul. 2, 2020 issued with respect to the related Indian Patent Application No. 201917051304.
Office Action dated Aug. 26, 2020 issued with respect to the related U.S. Appl. No. 16/788,377.
Office Action dated Apr. 29, 2020 issued with respect to the related U.S. Appl. No. 16/707,413.
Office Action dated Oct. 9, 2020 issued with respect to the related U.S. Appl. No. 16/707,413.
International Search Report dated Aug. 14, 2018 with respect to PCT/JP2018/022996.
Office Action dated Apr. 29, 2020 issued with respect to the related Indian Patent Application No. 201917051460.
Extended European Search Report dated Jun. 5, 2020 issued with respect to the related European Patent Application No. 18816514.6.
Office Action dated Apr. 14, 2020 issued with respect to the related U.S. Appl. No. 16/620,692.
Office Action dated Sep. 21, 2020 issued with respect to the related U.S. Appl. No. 16/620,692.
Office Action dated Feb. 8, 2021 issued with respect to the related U.S. Appl. No. 16/620,692.
Office Action dated Feb. 23, 2021 issued with respect to the corresponding Korean Patent Application No. 10-2019-7036762.
Office Action dated Feb. 23, 2021 issued with respect to the related Korean Patent Application No. 10-2019-7036761.
Office Action dated Mar. 12, 2021 issued with respect to the related Korean Patent Application No. 10-2019-7036769.
Office Action dated Feb. 25, 2021 issued with respect to the related Canadian Patent Application No. 3,067,198.
Shonaike, G.O. Advanced Polymeric Materials: Structure Property Relationships, CRC press, 2003 (Year: 2003).
Office Action dated Jan. 26, 2021 issued with respect to the related U.S. Appl. No. 16/788,377.

(56) References Cited

OTHER PUBLICATIONS

Office Action dated Jan. 25, 2021 issued with respect to the related Indian Patent Application No. 201917051304.
Office Action dated Mar. 15, 2021 issued with respect to the corresponding Canadian patent application No. 3,067,205.
Office Action dated May 20, 2021 issued with respect to the related U.S. Appl. No. 16/620,692.
Office Action dated May 27, 2021 issued with respect to the related Chinese Patent Application No. 201880039594.3.
Office Action dated Jun. 9, 2021 issued with respect to the related U.S. Appl. No. 16/788,377.

\* cited by examiner

MULTILAYER FILM, LAMINATE, AIRBAG, AND METHOD OF MANUFACTURING LAMINATE

CROSS-REFERENCE TO RELATED APPLICATION

The present application is a continuation application of International Application No. PCT/JP2018/022994 filed on Jun. 15, 2018, which is based on and claims priority to Japanese Patent Application No. 2017-119100 filed on Jun. 16, 2017. The contents of these applications are incorporated herein by reference in their entirety.

BACKGROUND OF THE INVENTION

1. Field of the Invention

The present invention relates to a multilayer film, a laminate, an airbag, and a method of manufacturing a laminate.

2. Description of the Related Art

Conventionally, polymeric films that are used upon being adhered to a fabric, and a laminate formed by adhering a film to a fabric, are known as materials used for vehicle airbags, outdoor products, packaging applications, and the like. For example, Patent Document 1 discloses a laminate made by laminating a thermoplastic elastomer onto a fabric made of thermoplastic resin fibers.

In recent years, various performances have been required for such films, particularly, high performance of adhesion after storage in high temperature and/or high humidity environments. On the other hand, it is also desired to manufacture the film at the lowest possible cost.

Patent Document 1: Japanese Unexamined Patent Application Publication No. H2-114035

Patent Document 1 describes that the configuration of the disclosure can improve the mechanical strength of the laminate, prevent the generation of pinholes, and the like, but does not discuss the adhesion under high temperature and/or high humidity conditions. Also, the cost is not considered.

In view of the above points, a problem to be solved by an embodiment of the present invention is to provide a multilayer film that has excellent adhesion under high temperature and/or high humidity conditions, and that can be manufactured at low cost.

SUMMARY OF THE INVENTION

According to one aspect of the present invention, there is provided a multilayer film used upon being adhered to a fabric, the multilayer film including an adhesive layer to be a side of the multilayer film to be adhered to the fabric, the adhesive layer including a thermoplastic polyester elastomer and a polymer having a Shore D hardness of less than 80; and a barrier layer bonded to the adhesive layer, the barrier layer including a thermoplastic elastomer.

DETAILED DESCRIPTION OF THE PREFERRED EMBODIMENTS (Multilayer Film)

Figure 1:
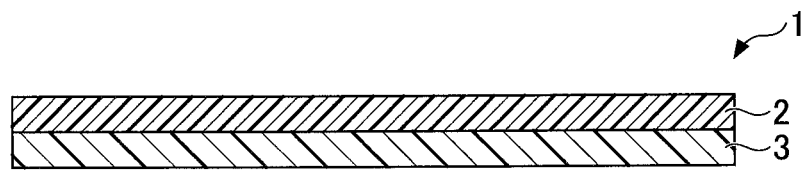
FIG. 1 is a schematic cross-sectional view of a multilayer film according to an embodiment of the present invention.

FIG. 1 illustrates a schematic cross-sectional view of a multilayer film 1. One embodiment of the present invention, as illustrated in FIG. 1, is the multilayer film 1 including a barrier layer 2 and an adhesive layer 3 bonded to the barrier layer 2. The multilayer film 1 is used upon being adhered to a fabric, and the adhesive layer 3 is the side that is adhered to the fabric.

As used in the present specification, the barrier layer is a layer that functions to prevent the flow of gas in and out the layer. Further, the adhesive layer is a layer that has adhesion to the fabric, and the adhesion may be exhibited by softening or melting the adhesive layer under a predetermined condition, for example, under a condition where the temperature and/or the pressure are increased. When a multilayer film is adhered to the fabric to form a laminate, the adhesive layer is directly laminated to the fabric and becomes an inner layer sandwiched between the fabric and the barrier layer in the laminate. Accordingly, the adhesive layer can be said to be a layer for bonding the barrier layer and the fabric.

The multilayer film according to the present embodiment has a structure including at least two layers that are the barrier layer and the adhesive layer. This allows each layer to separately have an adhesive function when the film is adhered to the fabric and an airtight function in the resulting laminate. Therefore, when a multilayer film according to the present embodiment is used, high-quality laminate, having both adhesion to the fabric (resistance to delamination between the fabric and the thermoplastic film) and airtightness, can be reliably manufactured, as compared to a case where a monolayer film is adhered to the fabric.

Further, the adhesive layer includes a thermoplastic polyester elastomer and a resin having a Shore D hardness of less than 80, and thus has excellent adhesion after storage under high temperature and/or high humidity conditions. Further, because it is possible to reduce the usage amount of thermoplastic polyester elastomer that is relatively expensive, the multilayer film can be manufactured at low cost. In the present specification, a Shore D hardness is a hardness measured by using a type D durometer in the method specified in JIS K 7215.

Further, the multilayer film according to the present embodiment can be satisfactorily adhered to the fabric by using heat, without using an adhesive or the like, thereby reducing the labor and cost of using an adhesive. Further, when the laminate is used for a long period of time or in a high-temperature, high-humidity environment, it is possible to prevent the laminate from losing flexibility and to prevent delamination, caused by alteration of the adhesive.

(Adhesive Layer)

The adhesive layer includes a thermoplastic polyester elastomer and a polymer having a Shore D hardness of less than 80. This composition improves the resistance to delamination of the resulting laminate at a low cost. That is, the adhesion between the adhesive layer and the fabric and the adhesion between the adhesive layer and the barrier layer can be improved at room temperature and under high temperature and/or high humidity conditions. Further, it is possible to improve the flexibility and mechanical strength of the entire laminate in a well-balanced manner.

Further, the adhesive layer may include a thermoplastic elastomer and a thermoplastic resin, more specifically, a thermoplastic polyester elastomer and an ethylene-vinyl acetate copolymer. This composition improves the resistance to delamination of the resulting laminate at a low cost. That is, the adhesion between the adhesive layer and the fabric and the adhesion between the adhesive layer and the barrier layer can be improved at room temperature and under high temperature and/or high humidity conditions. Further, the flexibility and mechanical strength of the entire laminate can be improved.

Preferably, the thermoplastic elastomer is a block copolymer including a hard segment (also referred to as a high melting point segment or a crystalline segment) and a soft segment (also referred to as a low melting point segment or an amorphous segment). The thermoplastic elastomer can exhibit fluidity when softened by heat, and can exhibit rubbery elasticity in the absence of heat.

In the present embodiment, by including a thermoplastic polyester elastomer in the adhesive layer, the adhesion to the fabric can be improved. Further, the flexibility and mechanical strength of the resulting laminate can be improved, and degradation in high temperature and/or high humidity environments can be prevented.

The thermoplastic polyester elastomer may be of the polyester-polyether type including primarily aromatic polyester, etc., as a hard segment and primarily aliphatic polyether, etc., as a soft segment. Alternatively, the thermoplastic polyester elastomer may be of the polyester-polyester type including primarily aromatic polyester, etc., as a hard segment and primarily aliphatic polyester, etc., as a soft segment.

The hard segment of the thermoplastic polyester elastomer is preferably a segment including polyester formed by an aromatic polyester, for example, an aromatic dicarboxylic acid component and a diol component.

Examples of aromatic dicarboxylic acids forming the aromatic dicarboxylic acid component include terephthalic acid, isophthalic acid, phthalic acid, naphthalene-2,6-dicarboxylic acid, naphthalene-2,7-dicarboxylic acid, anthracene dicarboxylic acid, diphenyl-4,4'-dicarboxylic acid, diphenoxyethanedicarboxylic acid, 4,4'-diphenyl ether dicarboxylic acid, 5-sulfoisophthalic acid, and sodium 3-sulfoisophthalate. The aromatic dicarboxylic acid component may be included in the aromatic polyester, either alone or as a combination of two or more kinds. Also, in the hard segment, a portion of the aromatic dicarboxylic acid component may be replaced by an alicyclic or aliphatic carboxylic acid.

The diol forming the diol component may be a diol having a molecular weight of 400 or less, and examples include aliphatic diols such as 1,4-butanediol, ethylene glycol, trimethylene glycol, pentamethylene glycol, hexamethylene glycol, neopentyl glycol, decamethylene glycol and the like; alicyclic diols such as 1,1-cyclohexanedimethanol, 1,4-dicyclohexanedimethanol, tricyclodecanedimethanol and the like; and aromatic diols such as xylylene glycol, bis(p-hydroxy)diphenyl, bis(p-hydroxy)diphenylpropane, 2,2'-bis[4-(2-hydroxyethoxy)phenyl]propane, bis[4-(2-hydroxyethoxy)phenyl]sulfone, 1,1-bis[4-(2-hydroxyethoxy)phenyl]cyclohexane, 4,4'-dihydroxy-p-terphenyl, and 4,4'-dihydroxy-p-quarter-phenyl and the like. The diol component may be included in the aromatic polyester either alone or as a combination of two or more kinds.

The polyester included in the hard segment is preferably polybutylene terephthalate, polyethylene terephthalate, and polytrimethylene terephthalate, and more preferably polybutylene terephthalate, from the viewpoint of heat resistance and gas barrier properties.

The soft segment of the thermoplastic polyester elastomer preferably includes an aliphatic polyether and/or an aliphatic polyester. Examples of the aliphatic polyether include poly(ethylene oxide) glycol, poly(propylene oxide) glycol, poly(tetramethylene oxide) glycol (polytetramethylene ether glycol), poly(hexamethylene oxide) glycol, copolymer of ethylene oxide and propylene oxide, ethylene oxide addition polymer of poly(propylene oxide) glycol, copolymer glycol of ethylene oxide and tetrahydrofuran and the like. Further, examples of the aliphatic polyester include poly($\varepsilon$-caprolactone), polyenanthractone, polycaprolactone, polybutylene adipate, polyethylene adipate and the like.

Among these aliphatic polyethers and/or aliphatic polyesters, from the viewpoint of elasticity and formability, poly(tetramethylene oxide) glycol, ethylene oxide addition polymer of poly(propylene oxide) glycol, copolymer glycol of ethylene oxide and tetrahydrofuran, poly($\varepsilon$-caprolactone), polybutylene adipate, and polyethylene adipate are preferable, and among these, poly(tetramethylene oxide) glycol (polytetramethylene ether glycol), ethylene oxide addition polymer of poly(propylene oxide) glycol, and copolymer glycol of ethylene oxide and tetrahydrofuran are particularly preferable.

The number average molecular weight of the soft segment is preferably approximately 300 to 6000 in the copolymerized state.

The thermoplastic polyester elastomer described above may be modified with an unsaturated carboxylic acid, such as acrylic acid, maleic acid, fumaric acid, or derivatives thereof, in the presence of a radical generating agent. It is preferable that the unsaturated carboxylic acid or derivatives thereof added for modification be 0.1 parts by weight to 30 parts by weight with respect to 100 parts by weight of the thermoplastic polyester elastomer. The type and amount of component used for such modification may be selected as appropriate, depending on the material or application of the fabric to be adhered.

The content ratio of the hard segment in the thermoplastic polyester elastomer in the adhesive layer is preferably 10% by weight to 60% by weight and more preferably 20% by weight to 40% by weight with respect to 100% by weight of the thermoplastic polyester elastomer. By setting the content ratio to be 10% by weight or more, the mechanical strength, heat resistance, and durability in high temperature and high humidity of the multilayer film and the laminate can be improved. Further, by setting the content ratio to be 60% by weight or less, it is possible to ensure proper elasticity, flexibility, and formability of the multilayer film and the laminate.

The content ratio of the soft segment in the thermoplastic polyester elastomer in the adhesive layer is preferably 50% by weight to 90% by weight and more preferably 60% by weight to 80% by weight with respect to 100% by weight of the thermoplastic polyester elastomer. By setting the content ratio to be 50% by weight or more, it is possible to ensure proper elasticity, flexibility, and formability of the multilayer film and the laminate. Further, by setting the content ratio to be 90% by weight or less, the mechanical strength of the multilayer film and the laminate can be improved.

The content ratio of the soft segment in the thermoplastic polyester elastomer is related to the melting point and the softening point of the thermoplastic polyester elastomer. Generally, the higher the content ratio of the soft segment in the thermoplastic polyester elastomer, the lower the melting point and the softening point of the thermoplastic polyester elastomer. Therefore, by adjusting the content ratio of the soft segment in the thermoplastic polyester elastomer in the adhesive layer, the melting point of the thermoplastic polyester elastomer can be adjusted, and consequently, the melting point of the adhesive layer can be adjusted.

The melting point of the thermoplastic polyester elastomer used in the adhesive layer is preferably 80° C. or higher, more preferably 100° C. or higher, and even more preferably 130° C. or higher. Further, the upper limit of the melting point of the thermoplastic polymer used for the adhesive layer is not particularly limited as long as the temperature of the melting point is below the melting point of the barrier layer; however, the upper limit of the melting point is preferably 250° C. or less, more preferably 200° C. or less, and even more preferably 170° C. or less. Note that the above melting point can be set as the melting peak temperature measured by a differential scanning calorimeter.

The adhesive layer may include two or more kinds of the thermoplastic polyester elastomers described above. In addition to the thermoplastic polyester elastomer, one or more kinds of another thermoplastic elastomer that is not polyester-based, such as a polyamide elastomer, a polyolefin elastomer, a polyurethane elastomer, a polystyrene elastomer, a polybutadiene elastomer and the like, may also be included.

Commercial products of thermoplastic polyester elastomer include the respective series of "Hytrel (registered trademark)" manufactured by Toray DuPont Co., Ltd., "Primalloy (registered trademark)" manufactured by Mitsubishi Chemical Co., Ltd., "Perprene (registered trademark)" manufactured by Toyo Spinning Co., Ltd., "Arnitel (registered trademark)" manufactured by Koninklijke DSM N.V., and the like.

For the adhesive layer, in addition to the thermoplastic polyester elastomer described above, a polymer having a Shore D hardness of less than 80 can be used. Accordingly, the advantages of the thermoplastic polyester elastomer, that is, mechanical strength, heat resistance, and durability under high temperature and high humidity can be maintained, while reducing the cost of manufacturing the multilayer film and improving flexibility.

Although the type of polymer having a Shore D hardness of less than 80 is not particularly limited, it is preferable that the polymer is less expensive than the thermoplastic polyester elastomer and can improve the flexibility of the adhesive layer when mixed with the thermoplastic polyester elastomer. More specifically, a polymer having a Shore D hardness of less than 80 is more preferably a polymer or copolymer (also referred to as a polyethylene-based polymer) including olefin units, such as ethylene units or propylene units, as monomer units. Further, when the polymer having a Shore D hardness of less than 80 is a thermoplastic elastomer, a hydrogenated thermoplastic elastomer is preferable, and a thermoplastic hydrogenated styrene elastomer is more preferable.

Specific examples of the polymer having a Shore D hardness of less than 80 include an ethylene-vinyl acetate copolymer, polyethylene, a hydrogenated styrene thermoplastic elastomer, and an ethylene-butyl acrylate copolymer. Among these polymers, low density polyethylene is preferable as polyethylene. These polymers can be used alone or as a combination of two or more kinds.

It is preferable to use the ethylene-vinyl acetate copolymer from the viewpoint of adhesion, flexibility, and cost, among the above-described polymers having a Shore D hardness of less than 80. The vinyl acetate component of the ethylene-vinyl acetate copolymer is preferably 5% by weight to 50% by weight with respect to the total ethylene-vinyl acetate copolymer.

The content ratio of the polymer having a Shore D hardness of less than 80 in the adhesive layer is preferably 1% to 60% by weight, and more preferably 10% by weight to 50% by weight. By setting the content ratio of the polymer having a Shore D hardness of less than 80 to 1% by weight or more, it is possible to reduce the manufacturing cost and improve the flexibility, and by setting the content ratio to 60% by weight or less, it is possible to improve the mechanical strength of the multilayer film.

Other components other than polymer may be added to the adhesive layer. Other components include additives such as pigments, fillers, antioxidants, hydrolytic stabilizers, anti-blocking agents and the like.

The overall thickness of the adhesive layer is preferably 5 μm to 50 μm, and more preferably 5 μm to 30 μm.

(Barrier Layer)

The material constituting the barrier layer is not particularly limited, but it is preferable to use a thermoplastic elastomer. Thermoplastic elastomers include a polyamide elastomer, a polyolefin elastomer, a polyurethane elastomer, a polystyrene elastomer, a polybutadiene elastomer and the like. Among the above, it is preferable to use a thermoplastic polyester elastomer in the barrier layer because the elastomer is the same type as that of the thermoplastic elastomer included in the adhesive layer. A polyester-based elastomer is included in both the barrier layer and the adhesive layer, and, therefore, the adhesion between the adhesive layer and the barrier layer (resistance to delamination) can be improved at room temperature and under high temperature and/or high humidity conditions.

When a thermoplastic polyester elastomer is used in the barrier layer, the thermoplastic polyester elastomer to be used in the barrier layer may be selected from the thermoplastic polyester elastomers in the adhesive layer described above.

When thermoplastic polyester elastomer is used in the barrier layer, the type of hard segment in the thermoplastic polyester elastomer used in the barrier layer and the type of hard segment in the thermoplastic polyester elastomer used in the adhesive layer may be the same as or may be different from each other. Further, the type of soft segment in the thermoplastic polyester elastomer used in the barrier layer and the type of soft segment in the thermoplastic polyester elastomer used in the adhesive layer may be the same or may be different from each other. The type of the hard segment and the type of the soft segment in the thermoplastic polyester elastomer used in the barrier layer, and the type of the hard segment and the type of the soft segment in the thermoplastic polyester elastomer used in the adhesive layer, may be the same or may be different from each other. If the segments are the same in type, the bonding force between the barrier layer and the adhesive layer is increased, making delamination within the multilayer film less likely and further improving the mechanical strength of the multilayer film and the laminate.

The melting point of the thermoplastic polyester elastomer used in the barrier layer is preferably a temperature that is above the melting point of the adhesive layer. Thus, when the multilayer film is heated at a temperature below the melting point of the barrier layer to adhere to the fabric, even when the adhesive layer is softened or melted so as to have an adhesive function, it is possible to prevent deformation or alteration of the barrier layer and the airtight function of the barrier layer can be maintained. This enables both reliable adhesion of the multilayer film to the fabric and maintenance of airtightness.

As used in the present specification, the melting point of a layer refers to the temperature at which the layer softens when the temperature of the layer is raised so that molecules of the polymer in the layer begin to move relative to each other and the polymer becomes fluid. Thus, the melting point of the adhesive layer and the barrier layer can be referred to as the melting point of the polymer (including the polymer alloy) in the adhesive layer and the barrier layer, respectively. The melting point of the polymer can be the melting peak temperature measured with a differential scanning calorimeter.

When the melting point of the barrier layer is higher than the melting point of the adhesive layer, the difference between the melting point of the barrier layer and the melting point of the adhesive layer may be preferably 10° C. to 100° C. or less, more preferably 20° C. to 80° C. or less, and even more preferably 20° C. or more. When the multilayer film is adhered to the fabric by using heat, it is preferable that the multilayer film and the fabric are laminated, and heated and pressurized at a temperature below the melting point of the barrier layer. In this case, by setting the difference between the melting point of the barrier layer and the melting point of the adhesive layer to be in the above-described range, the temperature can be easily controlled. Accordingly, it is possible to reduce the generation of defective products in which the adhesive layer fails to perform the adhesive function because of insufficient softening, or the airtightness is impaired due to deformation or alteration of the barrier layer caused by softening of the barrier layer, and because defective products can be reduced, the production stability can be improved.

When the barrier layer exhibits a melting point, the melting point of the barrier layer is preferably 100° C. or higher, more preferably 150° C. or higher, and even more preferably 180° C. or higher. Further, the upper limit of the melting point of the thermoplastic polymer used for the barrier layer is not particularly limited; however, it is preferable that the upper limit is 300° C. or less, more preferably 270° C. or less, and even more preferably 230° C. or less, in consideration of the ease of handling of the multilayer film during molding.

When the barrier layer includes thermoplastic polyester elastomer, the content ratio of the hard segment in the thermoplastic polyester elastomer in the barrier layer is preferably 40% by weight to 95% by weight and more preferably 60% by weight to 90% by weight with respect to 100% by weight of the thermoplastic polyester elastomer. By setting the content ratio to be 40% by weight or more, the mechanical strength, heat resistance, and durability in high temperature and high humidity of the multilayer film and laminate can be improved. Further, by setting the content ratio to be 95% by weight or less, it is possible to ensure proper elasticity, flexibility, and formability of the multilayer film and the laminate.

The content ratio of the soft segment in the thermoplastic polyester elastomer is preferably 5% by weight to 60% by weight, and more preferably 10% by weight to less than 50% by weight with respect to 100% by weight of the thermoplastic polyester elastomer. By setting the content ratio to be 5% by weight or more, proper elasticity, flexibility, and formability of the multilayer film and laminate can be ensured. By setting the content ratio to be 60% by weight or less, the mechanical strength, heat resistance, and durability in high temperature and high humidity of the multilayer film and the laminate can be improved.

It is preferable that the ratio value (Psa/Pss) of the content ratio (Psa) of the soft segment in the thermoplastic polyester elastomer in the adhesive layer, with respect to the content ratio (Pss) of the soft segment in the thermoplastic polyester elastomer in the barrier layer, is 1.2 to 5, and more preferably 1.4 to 3.5. The above-described range allows the production stability to be improved, and a multilayer film and a laminate with excellent elasticity and flexibility, while having mechanical strength and heat resistance, can be obtained.

When the barrier layer includes thermoplastic polyester elastomer, the barrier layer may include two or more kinds of the thermoplastic polyester elastomers described above. In the barrier layer, another thermoplastic elastomer that is not polyester-based may be compounded or a polymer that is not an elastomer may be compounded.

In the barrier layer, other components other than polymer may be added, similar to the adhesive layer. Other components include additives such as pigments, fillers, antioxidants, hydrolytic stabilizers, anti-blocking agents and the like.

The overall thickness of the barrier layer is preferably 5 μm to 50 μm, and more preferably, the overall thickness is 5 μm to 30 μm.

(Layer Structure of Multilayer Film)

As described above, the multilayer film includes a barrier layer and an adhesive layer. The adhesive layer may be one layer or a plurality of layers. When there is more than one adhesive layer, the materials forming each adhesive layer may be the same or different. The melting points of the respective plural adhesive layers may also be the same or different. The barrier layer may also be a single layer or a plurality of layers. When there is more than one barrier layer, the materials and melting points of the respective plural barrier layers may be the same or different.

In a specific configuration, a multilayer film, in which the first adhesive layer, the second adhesive layer, and the barrier layer are laminated in the stated order, may be formed. In this case, a dye, such as a pigment, may be added to either the first adhesive layer or the second adhesive layer. Such a configuration can reduce the amount of the used dye and reduce the cost of manufacturing the laminate.

Further, three adhesive layers may be provided, so as to form a multilayer film in which a first adhesive layer, a second adhesive layer, a third adhesive layer, and a barrier layer are laminated in the stated order. Further, two barrier layers may be provided, so as to form a multilayer film in which a first adhesive layer, a second adhesive layer, a first barrier layer, and a second barrier layer are laminated in the stated order.

The multilayer films can be manufactured by bonding an adhesive layer and a barrier layer. In this case, the adhesive layer and the barrier layer may be molded by extrusion or the like as separate sheets or films in advance, and may be bonded together to form an integral layer. Examples of the manufacturing method include melt compression bonding by hot pressing or hot rolling on the superimposed sheets or films, extrusion lamination to extrude a molten material onto the molded sheets or films, and the like.

Further, the materials of each of the adhesive layer and the barrier layer can be melted and then extruded and molded simultaneously by using, for example, a blown extrusion method or a T-die method. Among these, it is preferable to use the blown extrusion method in which the area can be increased so that excellent productivity can be achieved.

(Fabric)

The multilayer film according to the present embodiment is used upon being adhered to a fabric. As used in the present specification, a fabric is a structure having a sheet-like shape obtained by laminating a multilayer film with a fabric, and functioning as a support to ensure the strength of the laminate that is the final product. Here, the sheet-like shape includes not only a flat shape but also a cylindrical shape, a bag-like shape, and a balloon-like shape.

The fabric preferably includes fibers, and may be a woven fabric, a knitted fabric, or a non-woven fabric, and may be fully or partially sewn. Among these, a woven fabric is preferable because the mechanical strength is high, and preferably has a two-axis structure in which a plurality of warp yarns and a plurality of weft yarns are combined, and may have a three-axis structure in which a plurality of warp yarns, a plurality of weft yarns, and a plurality of oblique yarns are combined. Among these, a fabric having the 2-axis structure is preferable, and more preferably is a plain-woven fabric in terms of strength and ease of manufacturing. Further, rather than being a planar fabric, the fabric may be an OPW (One Piece Woven) that is woven into a bag without stitching so that the fabric can have a curved surface according to the shape of the intended product.

The OPW can be suitably used in applications such as airbags, which are inflated to store air inside and used. Among these applications, an OPW used for a curtain airbag has a complex curved surface with a plurality of chambers formed, and may have a structure in which irregularities are formed when inflated. Typically, when a film is adhered to a fabric having such an irregular structure, delamination between the fabric and the film is more likely to occur than when the film is adhered to a fabric without irregularities. However, by using the multilayer film according to the present embodiment, even in the case of an OPW having irregularities, the multilayer film can be adhered satisfactorily so that delamination can be prevented.

The fibers included in the fabric may be synthetic fibers, natural fibers, regenerated fibers, semi-synthetic fibers, inorganic fibers, and combinations thereof (including mix spinning or mix weaving). Among these, synthetic fibers, particularly polymeric fibers, are preferable. The fibers may also be composite fibers, such as core sheath fibers, side-by-side fibers, or split fibers.

Polymers constituting fibers include homopolyesters of polyalkylene terephthalate, such as polyethylene terephthalate and polybutylene terephthalate; polyester fibers in which isophthalic acid, 5-sodium sulfoisophthalic acid, or aliphatic dicarboxylic acid, such as adipic acid, are copolymerized with an acid component constituting a repeating unit of polyester; nylon 6.6, nylon 6, nylon 12, nylon 4.6, and a copolymer of nylon 6 and nylon 6.6; polyamide fibers in which polyalkylene glycol, dicarboxylic acid, amines, etc., are copolymerized with nylon; aramid fibers represented by a copolymer of paraphenylene terephthalamide and aromatic ether; rayon fibers; ultra-high molecular weight polyethylene fibers; sulfonic fibers such as paraphenylene sulfone and polysulfone; and polyether ketone fibers or the like.

Note that when the fabric is a woven fabric, the fabric may include two or more fibers, for example, for fibers used in yarns extending in different directions, different types of fibers may be used. More specifically, when the fabric has a two-axis structure including warp yarns and weft yarns, the warp yarns and weft yarns may be made of different types of fibers. In this case, at least one of the warp yarns and weft yarns may be a polyester fiber.

The multilayer film according to the present embodiment can be suitably used for lamination to a fabric including polyester fibers.

Preferably, the fabric is formed by using yarns having a total fineness (single yarn fineness x number of hybrid yarns) of 100 dtex to 700 dtex. Further, the single yarn fineness of the fibers used in the fabric is preferably 1 dtex to 10 dtex.

When the fabric is a plain-woven fabric, the weave density of the warp yarns and weft yarns is preferably 5 pcs/cm$^2$ to 30 pcs/cm$^2$, respectively.

In consideration of the storage capacity and cost of the laminate (the final product), the fabric weight (weight per m$^2$) of the fabric may be 300 g/m$^2$ or less, more preferably 200 g/m$^2$ or less, even more preferably 190 g/m$^2$ or less, even more preferably 150 g/m$^2$ or less, and 100 g/m$^2$ or less. Further, from the viewpoint of ensuring mechanical strength, the fabric weight may be preferably 30 g/m$^2$ or more, more preferably 50 g/m$^2$ or more, and even more preferably 70 g/m$^2$ or more.

(Laminate)

Figure 2:
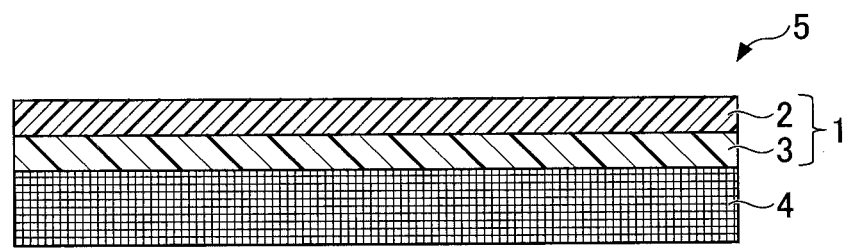
FIG. 2 is a schematic cross-sectional view of a laminate according to an embodiment of the present invention.

FIG. 2 illustrates a schematic cross-sectional view of a laminate according to an embodiment of the present invention. A laminate 5 is constituted by the multilayer film 1 including the barrier layer 2 and the adhesive layer 3 described above, and a fabric 4, adhered to each other.

Figure 3:
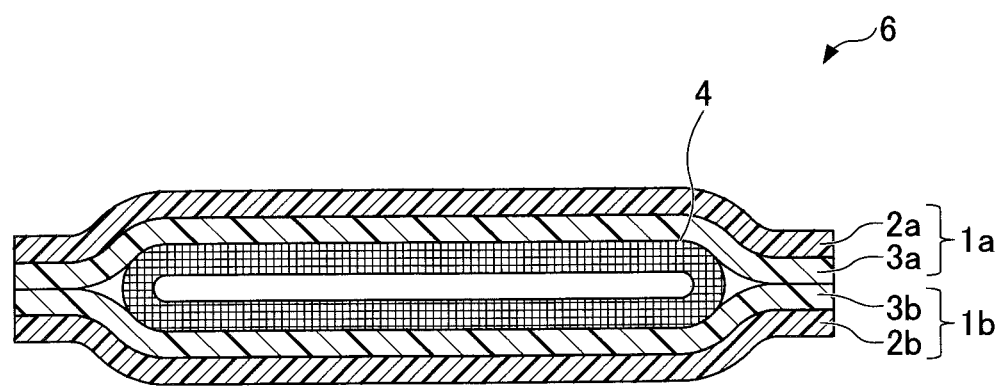
FIG. 3 is a schematic cross-sectional view of a laminate (airbag) according to an embodiment of the present invention.

In the example of FIG. 2, the multilayer film 1 is disposed on one side of the fabric 4; however, the multilayer film according to the present embodiment may be provided on both sides of the fabric 4. When an OPW folded into a bag without stitching is used as the fabric, as illustrated in FIG. 3, a multilayer film 1a and a multilayer film 1b may be laminated, on the top and the bottom, respectively, of the surface. The laminate illustrated in FIG. 3 may be used for an airbag or the like.

(Manufacturing Method of Laminate)

One embodiment of the present invention is a method of manufacturing the laminate having the multilayer film and the fabric as described above, including a step of adhering the side of the multilayer film with the adhesive layer to the fabric, while heating the multilayer film at a temperature below the melting point of the barrier layer.

Here, in the method of manufacturing the laminate according to the present embodiment, the term "film" means a flexible thin film, regardless of the temperature and the hardness or the like thereof. That is, the supplied multilayer film may be less than or equal to room temperature or may be higher than room temperature. Further, the multilayer film may also be softened so as to be at least partially capable of exerting an adhesive function. Accordingly, the laminate according to the present embodiment may be manufactured, for example, by adhering a multilayer film, which is supplied at less than or equal to room temperature, to a fabric while heating at a temperature below the melting point of the barrier layer by using a heating means. Alternatively, the laminate according to the present embodiment may be manufactured, for example, by adhering a polymer, which is heated and extruded into a film by an extruder, to a fabric.

Figure 4:
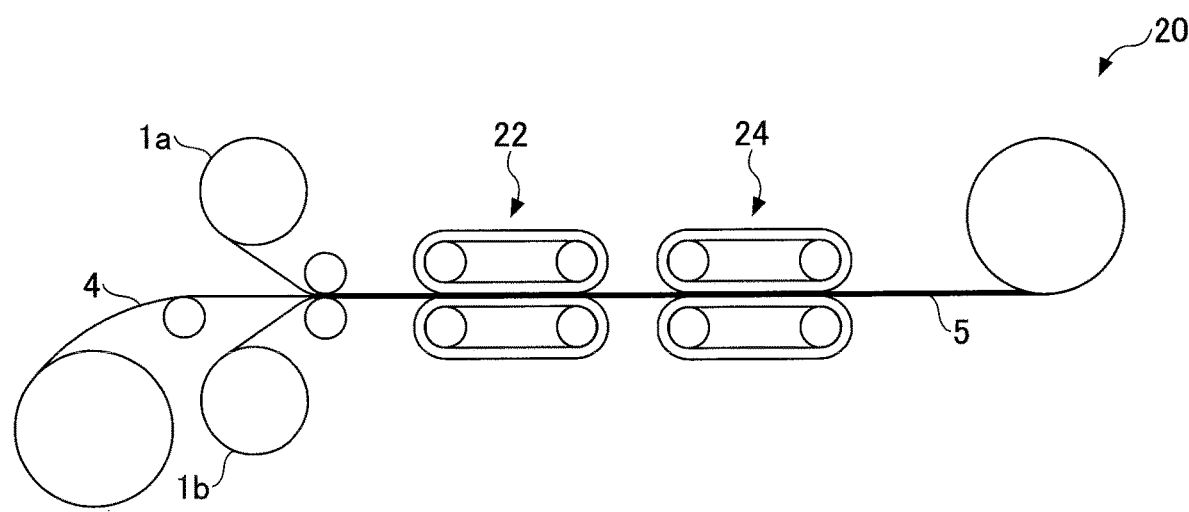
FIG. 4 is a schematic diagram of an apparatus for manufacturing a laminate according to an embodiment of the present invention.

FIG. 4 schematically illustrates a laminate manufacturing apparatus 20 for carrying out the method of manufacturing the laminate according to the present embodiment. FIG. 4 illustrates an apparatus for manufacturing a laminate in which multilayer films are laminated on both sides of the fabric 4. The laminate manufacturing apparatus 20 includes a heating unit 22 and a cooling unit 24.

In the manufacturing method using the laminate manufacturing apparatus 20 illustrated in FIG. 4, first, the fabric 4 and the multilayer films 1a and 1b that have been wound on reels or the like are unwound, respectively, and the multilayer films 1a and 1b are superimposed on both sides (the upper surface and the lower surface) of the fabric 4. Then, the superimposed multilayer film 1b, the fabric 4, and the multilayer film 1a are sent to the heating unit 22, and are pressed while being heated at the heating unit 22.

The heating unit 22 includes pressurizing means, for example, formed of a pair of opposing rollers (such as nip rollers) or a pair of opposing belts, such as the illustrated example. The superimposed multilayer film 1b, the fabric 4, and the multilayer film 1a are passed through a pair of pressurizing means as described above, so as to be heated and pressurized. Here, in the multilayer film, the melting point of the adhesive layer is a temperature that is below the melting point of the barrier layer, and, therefore, by setting the heating temperature in the heating unit 22 to be a temperature below the melting point of the barrier layer, it is possible to press the adhesive layer against the fabric in a state where the adhesive layer is sufficiently softened. This allows the multilayer films 1a and 1b to be adhered to both sides of the fabric 4, respectively, thereby forming the laminate 5 including the multilayer film 1b, the fabric 4, and the multilayer film 1a.

Subsequently, the laminate 5, that has been passed through the heating unit 22, is sent to the cooling unit 24. In the cooling unit 24, the temperature of the laminate 5 can be reduced to room temperature, preferably. The cooling unit 24 may include a cooling means including a cooling medium or a suction means. In the cooling unit 24, the laminate 5 may be pressurized by using a pressurizing means formed of a pair of opposing belts, as illustrated in the example; however, pressurization is not necessarily required.

In the manufacturing apparatus in FIG. 4, by omitting either one of the multilayer film 1a or the multilayer film 1b, it is possible to manufacture a laminate in which the multilayer film 1 is laminated on one side of the fabric 4 as illustrated in FIG. 2.

Further, the fabric 4 may be a tubular or bag-like OPW woven without stitching. This allows the laminate illustrated in FIG. 3 to be manufactured. In this case, air is removed from the inside of the bag-shaped fabric 4 so that the fabric 4 is in the form of a sheet, and the fabric 4 is wound on a reel or the like in advance, and is unwound before being superimposed. Then, the multilayer films 1a and 1b are superimposed on the upper and lower surfaces of the fabric 4, respectively, as described above. In this case, the fabric 4 is in the form of a bag, and, therefore, the upper surface and the lower surface of the fabric 4 both correspond to the surface of the fabric 4.

Figure 5:
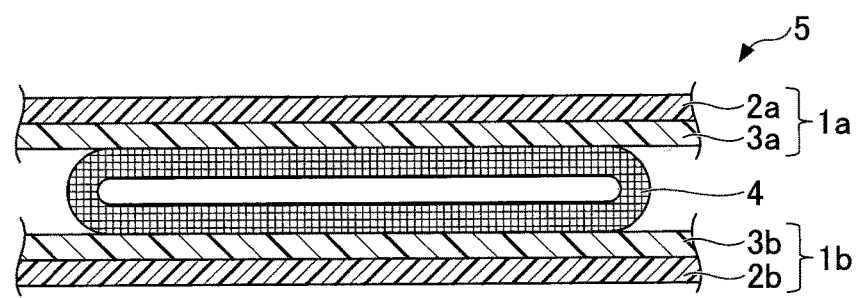
FIG. 5 is a schematic diagram illustrating a lamination of a fabric and a multilayer film in a manufacturing process of a laminate according to an embodiment of the present invention.

FIG. 5 schematically illustrates a state where the multilayer films 1a and 1b are respectively superimposed on the upper surface and lower surface of the fabric 4 that is loaded into the laminate manufacturing apparatus 20 in a flat state. Specifically, as illustrated in the figure, the multilayer film 1a, including a barrier layer 2a and an adhesive layer 3a, is superimposed so that the adhesive layer 3a is on the side of the fabric 4. Further, the multilayer film 1b, including a barrier layer 2b and an adhesive layer 3b, is superimposed so that the adhesive layer 3b is on the side of the fabric 4. Then, as illustrated in FIG. 5, the superimposed multilayer film 1a, the fabric 4, and the multilayer film 1b are pressurized from both sides by a pair of pressurizing means at the heating unit 22. Thus, as illustrated in FIG. 3, the multilayer films 1a and 1b are bonded to the upper and lower surfaces of the fabric 4, respectively, and the edges of the multilayer films 1a and 1b are bonded to each other by heating or by an adhesive, thereby obtaining a laminate (airbag) 6. The excessive parts of the edges may be cut off. In this manner, an airbag may be manufactured in which the fabric is formed into the shape of a bag and a multilayer film is formed on the surface of the fabric.

The heating temperature when manufacturing the laminate is not particularly limited, as long as the temperature is below the melting point of the barrier layer. The heating temperature may be a temperature below the melting point of the barrier layer and a temperature at which the adhesive layer softens. Specifically, the temperature is preferably 120° C. to 250° C. Further, the pressurizing pressure may be 5 N/cm$^2$ to 700 N/cm$^2$, preferably 10 N/cm$^2$ to 500 N/cm$^2$, depending on the composition of the multilayer film and the fabric. Further, the pressurizing pressure may be 5 N/cm$^2$ to 50 N/cm$^2$ depending on the operating conditions when manufacturing the laminate.

(Application)

The multilayer film and the laminate according to the present embodiment are suitable for use in vehicle airbags, outdoor products, packaging applications, and the like, and are particularly well suited for the manufacturing of vehicle airbags, particularly curtain airbags. A curtain airbag is mounted on the roof line at the top of the side window. When a high load is applied at the time of a collision, etc., the airbag is expanded into a shape of a curtain in a vertical downward direction along the side window.

The material of the curtain airbag is demanded to be pressure-resistant, because when the curtain airbag is expanded, the curtain airbag remains inflated for a few seconds, for example for 6 seconds to 7 seconds, after being activated. Further, before being expanded, a curtain airbag is often stored in a casing or the like in a folded or rolled up state for a long period of time, and is often exposed to high temperature and high humidity environments. Even for such applications, the multilayer film and the laminate according to the present embodiment can be suitably used.

PRACTICAL EXAMPLES

Although the present invention will be described in further detail in the following practical examples, the present invention is not limited to these practical examples.

In these practical examples, a multilayer film including a barrier layer and an adhesive layer was formed, and the multilayer film was adhered to a fabric to manufacture a laminate, and the manufactured laminate was evaluated.

[Raw Material for Multilayer Film]

The following materials were used as raw materials for the multilayer film. The melting point of each raw material is the melting peak temperature measured by a differential scanning calorimeter.

<Thermoplastic Elastomer>

Thermoplastic polyester elastomer (TPEE-1): a polyester-polyether block copolymer with polybutylene terephthalate as the hard segment and polytetramethylene ether glycol with a number-average molecular weight of 2000 as the soft segment. In the above copolymer, the content ratio of the polybutylene terephthalate is 28% by weight and the content ratio of the polytetramethylene ether glycol segment is 72% by weight (melting point 160° C.).

Thermoplastic polyester elastomer (TPEE-2): a polyester-polyether block copolymer with polybutylene terephthalate as the hard segment and polytetramethylene ether glycol with a number-average molecular weight of 2000 as the soft segment. In the above copolymer, the content amount of the polybutylene terephthalate is 58% by weight and the content ratio of the polytetramethylene ether glycol segment is 42% by weight (melting point 207° C.).

<Other Polymers>

Ethylene-vinyl acetate copolymer (EVA): "Evatan (registered trademark) 2805", manufactured by Arkema Inc., Shore D hardness 15 to 40

Polyethylene (PE): "PG7004", manufactured by Dow Chemical Co., Ltd., (low density polyethylene), Shore D hardness 45 to 55

Hydrogenated Styrene Thermoplastic Elastomer (SEBS): "Toughtech", manufactured by Asahi Kasei Corporation, Shore A hardness 40 or less (equivalent to Shore D hardness of approximately 8 or less)

Ethylene-butylacrylate copolymer (EBA): "Elvaloy", manufactured by DuPont de Nemours, Inc., Shore D hardness 30 to 50

Polymethyl methacrylate resin: "Acripet", manufactured by Mitsubishi Rayon Co., Ltd., Shore D hardness 80 to 100

[Evaluation of Multilayer Film and Laminate]

<High-Temperature, High-Humidity Adhesion (Resistance to Delamination Under High-Temperature, High-Humidity Conditions)>

A test piece having a size of 50 mm×150 mm was fabricated from the laminate obtained by adhering the multilayer film with the fabric as described below, and the test piece was placed in an airtight container and was maintained for 408 hours in the container in which the temperature was 70° C. and the relative humidity was 95%. While fixing the fabric portion of the test piece (laminate) taken out from the container, the force, which was required to pull the multilayer film portion (barrier layer and adhesive layer) in a direction of 180 degrees at the tensile rate of 100 mm/minute, was measured as the peel force (N/mm). The evaluation standard was as follows.

○ (good): The peel force exceeded 0.5 N/mm.

Δ (ordinary): The peel force was 0.3 N/mm to 0.5 N/mm.

x (bad): The peel force was less than 0.3 N/mm, or delamination occurred in the multilayer film.

When measuring the peel force, in order to prevent the multilayer film from being broken or stretched during the peel test, a polyethylene terephthalate film with a thickness of 100 μm was bonded to the barrier layer side of the multilayer film via an adhesive, to reinforce the multilayer film.

Practical Example 1

(Multilayer Film)

The multilayer film was manufactured by using a blown extrusion device (manufactured by Dr. Collin GmbH) having three extruders. In the respective extruders, a mixture of 70% by weight of the thermoplastic polyester elastomer (TPEE-1) and 30% by weight of the ethylene-vinyl acetate copolymer (EVA), the thermoplastic polyester elastomer (TPEE-1), and the thermoplastic polyester elastomer (TPEE-2) were loaded, and were melted at a temperature greater than or equal to the melting point of each raw material, and a three-layer film was fabricated by the blown extrusion method.

The resulting film was a three-layer film in which a first adhesive layer formed of the mixture of 70% by weight of the thermoplastic polyester elastomer (TPEE-1) and 30% by weight of the ethylene-vinyl acetate copolymer (EVA), a second adhesive layer formed of the thermoplastic polyester elastomer (TPEE-1), and a barrier layer formed of the thermoplastic polyester elastomer (TPEE-2) were laminated in the stated order. The extrusion amount of the first adhesive layer, the second adhesive layer, and the barrier layer was 10 g/m², respectively.

(Lamination of Multilayer Film and Fabric)

As a fabric, a plain-woven fabric woven with polyethylene terephthalate fibers was used. The total fineness of warp yarn and weft yarn was 470 dtex, and the weave density was 22 pcs/cm for each of the warp yarn and the weft yarn.

A laminating device (Twin-belt flat lamination system, manufactured by Maschinenfabrik Herbert Meyer GmbH) was used to laminate the PET fabric and the three-layer film so that the adhesive layer came into contact with the fabric surface, and the adhesive layer was softened while the laminated materials were heated at 170° C. and were pressurized with a nip roller to 18 N/cm², and the fabric and the three-layer film were laminated.

Practical Example 2

(Multilayer Film)

A three-layer film was fabricated in the same manner as practical example 1 except that a mixture of 70% by weight of the thermoplastic polyester elastomer (TPEE-1) and 30% by weight of the polyethylene (PE) was used, instead of the mixture of 70% by weight of the thermoplastic polyester elastomer (TPEE-1) and 30% by weight of the ethylene-vinyl acetate copolymer (EVA). The resulting film was a three-layer film in which a first adhesive layer including the thermoplastic polyester elastomer (TPEE-1) and the polyethylene (PE), a second adhesive layer including the thermoplastic polyester elastomer (TPEE-1), and a barrier layer including the thermoplastic polyester elastomer (TPEE-2) were laminated in the stated order.

(Lamination of Multilayer Film and Fabric)

In the same manner as practical example 1, a laminate including the fabric and the multilayer film was fabricated and evaluated. The results are given in Table 1.

Practical Example 3

A three-layer film was fabricated in the same manner as practical example 1, except that a mixture of 70% by weight of the thermoplastic polyester elastomer (TPEE-1), 15% by weight of the polyethylene (PE), and 15% by weight of the hydrogenated styrene thermoplastic elastomer (SEBS) was used instead of the mixture of 70% by weight of the thermoplastic polyester elastomer (TPEE-1) and 30% by weight of the ethylene-vinyl acetate copolymer (EVA). The resulting film was a three-layer film in which a first adhesive layer including the thermoplastic polyester elastomer (TPEE-1), the polyethylene (PE), and the hydrogenated styrene thermoplastic elastomer (SEBS), a second adhesive layer including the thermoplastic polyester elastomer (TPEE-1), and a barrier layer including the thermoplastic polyester elastomer (TPEE-2) were laminated in the stated order.

(Lamination of Multilayer Film and Fabric)

In the same manner as practical example 1, a laminate including the fabric and the multilayer film was fabricated and evaluated. The results are given in Table 1.

Practical Example 4

A three-layer film was fabricated in the same manner as practical example 1, except that a mixture of 70% by weight of the thermoplastic polyester elastomer (TPEE-1) and 30% by weight of the hydrogenated styrene thermoplastic elastomer (SEBS) was used instead of the mixture of 70% by weight of the thermoplastic polyester elastomer (TPEE-1) and 30% by weight of the ethylene-vinyl acetate copolymer (EVA). The resulting film was a three-layer film in which a first adhesive layer including the thermoplastic polyester elastomer (TPEE-1) and the hydrogenated styrene thermoplastic elastomer (SEBS), a second adhesive layer including the thermoplastic polyester elastomer (TPEE-1), and a barrier layer including the thermoplastic polyester elastomer (TPEE-2) were laminated in the stated order.

(Lamination of Multilayer Film and Fabric)

In the same manner as practical example 1, a laminate including the fabric and the multilayer film was fabricated and evaluated. The results are given in Table 1.

Practical Example 5

A three-layer film was fabricated in the same manner as practical example 1 except that a mixture of 70% by weight of the thermoplastic polyester elastomer (TPEE-1) and 30% by weight of the ethylene-butyl acrylate copolymer (EBA) was used instead of the mixture of 70% by weight of the thermoplastic polyester elastomer (TPEE-1) and 30% by weight of the ethylene-vinyl acetate copolymer (EVA). The resulting film was a three-layer film in which a first adhesive layer including the thermoplastic polyester elastomer (TPEE-1) and the ethylene-butyl acrylate copolymer (EBA), a second adhesive layer including the thermoplastic polyester elastomer (TPEE-1), and a barrier layer including the thermoplastic polyester elastomer (TPEE-2) were laminated in the stated order.

(Lamination of Multilayer Film and Fabric)

In the same manner as practical example 1, a laminate including the fabric and the multilayer film was fabricated and evaluated. The results are given in Table 1.

Comparative Example 1

(Multilayer Film)

A three-layer film was fabricated in the same manner as practical example 1 except that 100% by weight of the thermoplastic polyester elastomer (TPEE-1) was used instead of the mixture of 70% by weight of the thermoplastic polyester elastomer (TPEE-1) and 30% by weight of the ethylene-vinyl acetate copolymer (EVA). The resulting film was a three-layer film in which a first adhesive layer including the thermoplastic polyester elastomer (TPEE-1), a second adhesive layer including the thermoplastic polyester elastomer (TPEE-1), and a barrier layer including the thermoplastic polyester elastomer (TPEE-2) were laminated in the stated order.

(Lamination of Multilayer Film and Fabric)

In the same manner as practical example 1, a laminate including the fabric and the multilayer film was fabricated and evaluated. The results are given in Table 1.

Comparative Example 2

(Multilayer Film)

A three-layer film was fabricated in the same manner as practical example 1 except that 100% by weight of the ethylene-vinyl acetate copolymer (EVA) was used instead of the mixture of 70% by weight of the thermoplastic polyester elastomer (TPEE-1) and 30% by weight of the ethylene-vinyl acetate copolymer (EVA). The resulting film was a three-layer film in which a first adhesive layer including the ethylene-vinyl acetate copolymer (EVA), a second adhesive layer including the thermoplastic polyester elastomer (TPEE-1), and a barrier layer including the thermoplastic polyester elastomer (TPEE-2) were laminated in the stated order.

(Lamination of Multilayer Film and Fabric)

In the same manner as practical example 1, a laminate including the fabric and the multilayer film was fabricated and evaluated. The results are given in Table 1.

Comparative Example 3

(Multilayer Film)

A three-layer film was fabricated in the same manner as practical example 1, except that a mixture of 70% by weight of the thermoplastic polyester elastomer (TPEE-1) and 30% by weight of the polymethyl methacrylate resin (PMMA) was used instead of the mixture of 70% by weight of the thermoplastic polyester elastomer (TPEE-1) and 30% by weight of the ethylene-vinyl acetate copolymer (EVA). The resulting film was a three-layer film in which a first adhesive layer including the thermoplastic polyester elastomer (TPEE-1) and the polymethyl methacrylate resin (PMMA), a second adhesive layer including the thermoplastic polyester elastomer (TPEE-1), and a barrier layer including the thermoplastic polyester elastomer (TPEE-2) were laminated in the stated order.

(Lamination of Multilayer Film and Fabric)

In the same manner as practical example 1, a laminate including the fabric and the multilayer film was fabricated and evaluated. The results are given in Table 1.

TABLE 1

| | COMPOSITION OF FIRST ADHESIVE LAYER | | | | EVALUATION | | |
|---|---|---|---|---|---|---|---|
| | THERMOPLASTIC ELASTOMER | | OTHER POLYMER | | ADHESION AT HIGH TEMPERATURE AND HIGH HUMIDITY | FLEXIBILITY | COST |
| | TYPE | CONTENT AMOUNT (% BY WEIGHT) | TYPE | CONTENT AMOUNT (% BY WEIGHT) | | | |
| PRACTICAL EXAMPLE 1 | TPEE-1 | 70 | EVA | 30 | ○ | ○ | ○ |
| PRACTICAL EXAMPLE 2 | TPEE-1 | 70 | PE | 30 | ○ | ○ | ○ |
| PRACTICAL | TPEE-1 | 70 | PE + SEBS | 30 | ○ | ○ | ○ |

TABLE 1-continued

| | COMPOSITION OF FIRST ADHESIVE LAYER | | | | EVALUATION | | |
|---|---|---|---|---|---|---|---|
| | THERMOPLASTIC ELASTOMER | | OTHER POLYMER | | ADHESION | | |
| | TYPE | CONTENT AMOUNT (% BY WEIGHT) | TYPE | CONTENT AMOUNT (% BY WEIGHT) | AT HIGH TEMPERATURE AND HIGH HUMIDITY | FLEXIBILITY | COST |
| EXAMPLE 3 | | | | | | | |
| PRACTICAL EXAMPLE 4 | TPEE-1 | 70 | SEBS | 30 | ○ | ○ | Δ |
| PRACTICAL EXAMPLE 5 | TPEE-1 | 70 | EBA | 30 | ○ | ○ | Δ |
| COMPARATIVE EXAMPLE 1 | TPEE-1 | 100 | — | 0 | ○ | ○ | X |
| COMPARATIVE EXAMPLE 2 | — | 0 | EVA | 100 | X | ○ | ○ |
| COMPARATIVE EXAMPLE 3 | TPEE-1 | 70 | PMMA | 30 | X | X | ○ |

As indicated in Table 1, the laminates of practical examples 1 to 5 having an adhesive layer including a thermoplastic polyester elastomer and a polymer having a Shore D hardness of less than 80 had excellent adhesion at high temperature and high humidity as well as flexibility, and were manufactured at low cost. Among practical examples 1 to 5, practical examples 1 to 3 were particularly superior in terms of cost.

With respect to comparative example 1, the adhesion of the laminate at high temperature and high humidity was excellent, but the cost was higher than that of any of practical examples 1 to 5. Note that the laminate of comparative example 1 also had sufficient flexibility (evaluation: ○, excellent flexibility as an airbag application), but the flexibility of the laminate of comparative example 1 was slightly lower than those of practical examples 1 to 5. Further, the laminate of comparative example 2 was highly flexible and was manufactured at low cost; however, it was found that the adhesion at high temperature and high humidity was inferior to that of practical example 1.

The following are notes of preferred embodiments of the present invention.

(Note 1) A multilayer film used upon being adhered to a fabric, the multilayer film comprising:
an adhesive layer to be a side of the multilayer film to be adhered to the fabric; and
a barrier layer bonded to the adhesive layer, wherein
the adhesive layer includes a thermoplastic polyester elastomer and an ethylene-vinyl acetate copolymer.

(Note 2) The multilayer film according to note 1, wherein a melting point of the barrier layer is higher than a melting point of the adhesive layer.

(Note 3) The multilayer film according to note 1 or 2, wherein the thermoplastic polyester elastomer included in the adhesive layer is a block copolymer including a soft segment including polyether and a hard segment including polyester.

(Note 4) The multilayer film according to any one of notes 1 to 3, wherein the barrier layer includes a thermoplastic polyester elastomer.

(Note 5) The multilayer film according to any one of notes 1 to 4, wherein the fabric includes polyester.

(Note 6) The multilayer film according to any one of notes 1 to 5, wherein the fabric is a fabric used for an airbag.

(Note 7) A laminate formed by adhering the multilayer film according to any one of notes 1 to 6 and the fabric to each other.

(Note 8) An airbag formed by using the laminate according to note 7, wherein
the fabric is formed to have a shape of a bag, and
the multilayer film is formed on a surface of the fabric.

(Note 9) A method of manufacturing a laminate including the multilayer film according to any one of notes 1 to 6 and the fabric, the method comprising:
a step of adhering the side of the multilayer film with the adhesive layer to the fabric, while heating the multilayer film at a temperature below a melting point of the barrier layer.

According to an embodiment of the present invention, a multilayer film that has excellent adhesion under high temperature and/or high humidity conditions, and that can be manufactured at low cost, can be provided.

The multilayer film, the laminate, the airbag, and the method of manufacturing a laminate are not limited to the specific embodiments described in the detailed description, and variations and modifications may be made without departing from the spirit and scope of the present invention.

What is claimed is:

1. An airbag comprising:
a fabric formed to have a shape of a bag; and
a multilayer film including
an adhesive layer that includes a thermoplastic polyester elastomer and a polymer having a Shore D hardness of less than 80, the adhesive layer including at least a first layer and a second layer of different compositions; and
a barrier layer bonded to the adhesive layer, the barrier layer including a thermoplastic polyester elastomer, and having a melting point equal to or greater than 180° C., wherein
the fabric is adhered to the first layer of the adhesive layer;
the barrier layer is adhered to the second layer of the adhesive layer;
at least one layer of the first layer or the second layer includes the polymer having the Shore D hardness of less than 80; and
a content ratio of a soft segment in the thermoplastic polyester elastomer included in the barrier layer is 5% by weight to 60% by weight with respect to 100% by weight of the thermoplastic polyester elastomer included in the barrier layer.

2. The airbag according to claim 1, wherein the polymer having the Shore D hardness of less than 80 includes one or more types selected from the group consisting of ethylene-vinyl acetate copolymer, polyethylene, a hydrogenated styrene thermoplastic elastomer, and an ethylene-butyl acrylate copolymer.

3. The airbag according to claim 1, wherein
the melting point of the barrier layer is higher than a melting point of the adhesive layer.

4. The airbag according to claim 1, wherein
the thermoplastic polyester elastomer included in the adhesive layer includes a soft segment including polyether and a hard segment including polyester.

5. The airbag according to claim 1, wherein
a ratio value of a content ratio of a soft segment in the thermoplastic polyester elastomer in the adhesive layer with respect to a content ratio of a soft segment in the thermoplastic polyester elastomer in the barrier layer, is 5 or less.

6. The airbag according to claim 1, wherein
a ratio value of a content ratio of a soft segment in the thermoplastic polyester elastomer in the adhesive layer with respect to a content ratio of a soft segment in the thermoplastic polyester elastomer in the barrier layer, is 1.2 or more.

7. The airbag according to claim 1, wherein
a ratio value of a content ratio of a soft segment in the thermoplastic polyester elastomer in the adhesive layer with respect to a content ratio of a soft segment in the thermoplastic polyester elastomer in the barrier layer, is 1.2 to 5.

8. The airbag according to claim 1, wherein
a content ratio of the polymer having the Shore D hardness of less than 80 in the adhesive layer, is 1% by weight to 60% by weight.

9. The airbag according to claim 1, wherein
a content ratio of a soft segment in the thermoplastic polyester elastomer included in the adhesive layer is 50% by weight to 90% by weight with respect to 100% by weight of the thermoplastic polyester elastomer included in the adhesive layer.

10. The airbag according to claim 1, wherein
the first layer of the adhesive layer includes the thermoplastic polyester elastomer and the polymer having the Shore D hardness of less than 80, and
the second layer of the adhesive layer includes the thermoplastic polyester elastomer.

11. The airbag according to claim 1, wherein
the fabric includes polyester.

12. The airbag according to claim 1, wherein
the adhesive layer includes 30 wt % to 60 wt % of the polymer having the Shore D hardness of less than 80.

13. The airbag according to claim 1, wherein
a content ratio of the polymer having the Shore D hardness of less than 80 in the first adhesive layer is 1% by weight to 60% by weight.

14. The airbag according to claim 1, wherein
the first adhesive layer includes the polymer having the Shore D hardness of less than 80, and
the polymer having the Shore D hardness of less than 80 is one or more polymers selected from the group consisting of an ethylene-vinyl acetate copolymer, polyethylene, a hydrogenated styrene thermoplastic elastomer, and an ethylene-butyl acrylate copolymer.

15. The airbag according to claim 1, wherein
a second adhesive layer of the two or more adhesive layers is provided on a side of the multilayer film that is adhered to the barrier layer,
the polymer having the Shore D hardness of less than 80 is provided in one of either the first adhesive layer or the second adhesive layer, and
the polymer having the Shore D hardness of less than 80 is an ethylene-vinyl acetate copolymer.

16. The airbag according to claim 1, wherein
the first adhesive layer includes the polymer having the Shore D hardness of less than 80, and
the polymer having the Shore D hardness of less than 80 is polyethylene.

* * * * *